United States Patent
Lo et al.

(10) Patent No.: US 11,868,132 B2
(45) Date of Patent: Jan. 9, 2024

(54) SYSTEM AND METHOD FOR IMPLEMENTING PEDESTRIAN AVOIDANCE STRATEGIES FOR A MOBILE ROBOT

(71) Applicant: Honda Motor Co., Ltd., Tokyo (JP)

(72) Inventors: Shih-Yun Lo, Austin, TX (US); Katsu Yamane, Mountain View, CA (US); Kenichiro Sugiyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 16/740,723

(22) Filed: Jan. 13, 2020

(65) Prior Publication Data
US 2020/0272155 A1 Aug. 27, 2020

Related U.S. Application Data

(60) Provisional application No. 62/809,178, filed on Feb. 22, 2019.

(51) Int. Cl.
*G05D 1/02* (2020.01)
*G05D 1/00* (2006.01)
(Continued)

(52) U.S. Cl.
CPC ......... *G05D 1/0212* (2013.01); *G05D 1/0088* (2013.01); *G05D 1/0214* (2013.01);
(Continued)

(58) Field of Classification Search
None
See application file for complete search history.

(56) References Cited

U.S. PATENT DOCUMENTS

| 10,496,091 | B1 * | 12/2019 | Ross | G06N 5/04 |
| 2020/0174490 | A1 * | 6/2020 | Ogale | G06N 3/084 |
| 2020/0189573 | A1 * | 6/2020 | King | G06V 20/58 |

FOREIGN PATENT DOCUMENTS

| JP | 2009110495 | 5/2009 |
| JP | 2009187343 | 8/2009 |

(Continued)

OTHER PUBLICATIONS

E. T. Hall, The hidden dimension. Garden City, NY: Doubleday, 1966, vol. 609.

(Continued)

*Primary Examiner* — Adam D Tissot
*Assistant Examiner* — Garrett F Evans
(74) *Attorney, Agent, or Firm* — RANKIN, HILL & CLARK LLP

(57) ABSTRACT

A system and method for implementing pedestrian avoidance strategies for a mobile robot that include receiving position data of a pedestrian and the mobile robot from systems of the mobile robot and estimating positions of the pedestrian and the mobile robot based on the position data. The system and method also include determining an expected intersection point of paths of the pedestrian and the mobile robot and an estimated time for the pedestrian to reach and cross the expected intersection point of the paths. The system and method further include implementing a pedestrian avoidance strategy based on the positions of the pedestrian and the mobile robot and the expected point in time when the pedestrian will reach and cross the expected intersection point of the paths.

20 Claims, 7 Drawing Sheets

(51) Int. Cl.
G06N 3/08 (2023.01)
G06V 20/56 (2022.01)
G06F 18/214 (2023.01)
G06V 20/58 (2022.01)
G06V 40/10 (2022.01)

(52) U.S. Cl.
CPC ......... *G05D 1/0221* (2013.01); *G05D 1/0223* (2013.01); *G06F 18/214* (2023.01); *G06N 3/08* (2013.01); *G06V 20/56* (2022.01); *G06V 20/58* (2022.01); *G06V 40/103* (2022.01)

(56) References Cited

FOREIGN PATENT DOCUMENTS

| JP | 2010079697 | 4/2010 |
|----|------------|--------|
| JP | 2013225253 | 10/2013 |
| WO | WO2011064821 | 6/2011 |

OTHER PUBLICATIONS

Japanese Office Action of Serial No. 2020-027791 dated Feb. 2, 2021, 2 pages.
J. T. Butler and A. Agah, "Psychological effects of behavior patterns of a mobile personal robot," Autonomous Robots, vol. 10, No. 2, pp. 185-202, 2001.
E. Pacchierotti, H. I. Christensen, and P. Jensfelt, "Embodied social interaction for service robots in hallway environments," in Field and service robotics. Springer, 2006, pp. 293-304.
K. Yamane and C. Kurosu, "Robust control of self-balancing mobile robots in variable environment," in Proceedings of IEEE/RSJ International Conference on Intelligent Robots and Systems, 2019 (submitted).
G. Arechavaleta, J.-P. Laumond, H. Hicheur, and A. Berthoz, "An optimality principle governing human walking," IEEE Transactions on Robotics, vol. 24, No. 1, pp. 5-14, 2008.
Y. F. Chen, M. Everett, M. Liu, and J. P. How, "Socially aware motion planning with deep reinforcement learning," arXiv preprint arXiv:1703.08862, 2017.
K. Dautenhahn, M. Walters, S. Woods, K. L. Koay, C. L. Nehaniv, A. Sisbot, R. Alami, and T. Siméon, "How may I serve you?: a robot companion approaching a seated person in a helping context," in Proceedings of the 1st ACM SIGCHI/SIGART conference on Human-robot interaction. ACM, 2006, pp. 172-179.
A. D. Dragan, K. C. Lee, and S. S. Srinivasa, "Legibility and predictability of robot motion," in Human-Robot Interaction (HRI), 2013 8th ACM/IEEE International Conference on. IEEE, 2013, pp. 301-308.
D. Fox, W. Burgard, and S. Thrun, "The dynamic window approach to collision avoidance," IEEE Robotics and Automation Magazine, vol. 4, No. 1, pp. 23-33, 1997.
D. Helbing and P. Molnar, "Social force model for pedestrian dynamics," Physical Review E, vol. 51, pp. 4282-4286, 1995.
N. Hogan, "An organizing principle for a class of voluntary movements," Journal of Neuroscience, vol. 4, No. 11, pp. 2745-2754, 1984.
B. Kim and J. Pineau, "Socially adaptive path planning in human environments using inverse reinforcement learning," International Journal of Social Robotics, vol. 8, No. 1, pp. 51-66, 2015.
R. Kirby, R. Simmons, and J. Forlizzi, "Companion: A constraint-optimizing method for person-acceptable navigation," in IEEE International Symposium on Robot and Human Interactive Communication (RO-MAN), 2009, pp. 607-612.
H. Kretzschmar, M. Spies, C. Sprunk, and W. Burgard, "Socially compliant mobile robot navigation via inverse reinforcement learning," the International Journal of Robotics Research, vol. 35, No. 11, pp. 1289-1307, 2016.
T. Kruse, P. Basili, S. Glasauer, and A. Kirsch, "Legible robot navigation in the proximity of moving humans," in Advanced Robotics and its Social Impacts (ARSO), 2012 IEEE Workshop on. IEEE, 2012, pp. 83-88.
M. Kuderer, H. Kretzschmar, C. Sprunk, and W. Burgard, "Feature-based prediction of trajectories for socially compliant navigation." in Robotics: science and systems. Citeseer, 2012.
C. Lichtenthäler, T. Lorenz, and A. Kirsch, "Inflence of legibility on perceived safety in a virtual human-robot path crossing task," in IEEE International Symposium on Robot and Human Interactive Communication (RO-MAN), 2012, pp. 676-681.
M. Luber, L. Spinello, J. Silva, and K. Arras, "Socially-aware robot navigation: A learning approach," in IEEE/RSJ International Conference on Intelligent Robots and Systems, 2012, pp. 902-907.
C. I. Mavrogiannis and R. A. Knepper, "Decentralized multi-agent navigation planning with braids," in Proceedings of the Workshop on the Algorithmic Foundations of Robotics. San Francisco, USA, 2016.
E. Pacchierotti, H. Christensen, and P. Jensfelt, "Evaluation of passing distance for social robots," in IEEE International Symposium on Robot and Human Interactive Communication (RO-MAN), 2006.
P. Papadakis, P. Rives, and A. Spalanzani, "Adaptive spacing in human-robot interactions," in Proceedings of IEEE/RSJ International Conference on Intelligent Robots and Systems, 2014, pp. 2627-2632.
S. Paris, J. Pettré, and S. Donikian, "Pedestrian reactive navigation for crowd simulation: a predictive approach," in Computer Graphics Forum, vol. 26, No. 3. Wiley Online Library, 2007, pp. 665-674.
J. Rios-Martinez, A. Renzaglia, A. Spalanzani, A. Martinelli, and C. Laugier, "Navigating between people: a stochastic optimization approach," in IEEE International Conference on Robotics and Automation, 2012, pp. 2880-2885.
M. Shiomi, F. Zanlungo, K. Hayashi, and T. Kanda, "Towards a socially acceptable collision avoidance for a mobile robot navigating among pedestrians using a pedestrian model," International Jounral of Social Robotics, vol. 6, No. 3, pp. 443-455, 2014.
L. Takayama, D. Dooley, and W. Ju, "Expressing thought: improving robot readability with animation principles," in Human-Robot Interaction (HRI), 2011 6th ACM/IEEE International Conference on, 2011, pp. 69-76.
P. Trautman, J. Ma, R. M. Murray, and A. Krause, "Robot navigation in dense human crowds: Statistical models and experimental studies of human-robot cooperation," The International Journal of Robotics Research, vol. 34, No. 3, pp. 335-356, 2015.
C. Vassallo, A.-H. Olivier, P. Soueres, A. Crétual, O. Stasse, and J. Pettré, "How do walkers avoid a mobile robot crossing their way?" Gait and Posture, vol. 51, pp. 97-103, 2017.
M. L. Walters, K. Dautenhahn, R. Te Boekhorst, K. L. Koay, C. Kaouri, S. Woods, C. Nehaniv, D. Lee, and I. Werry, "The influence of subjects' personality traits on personal spatial zones in a human-robot interaction experiment," in Robot and Human Interactive Communication, 2005. Roman 2005. IEEE International Workshop on, 2005, pp. 347-352.

\* cited by examiner

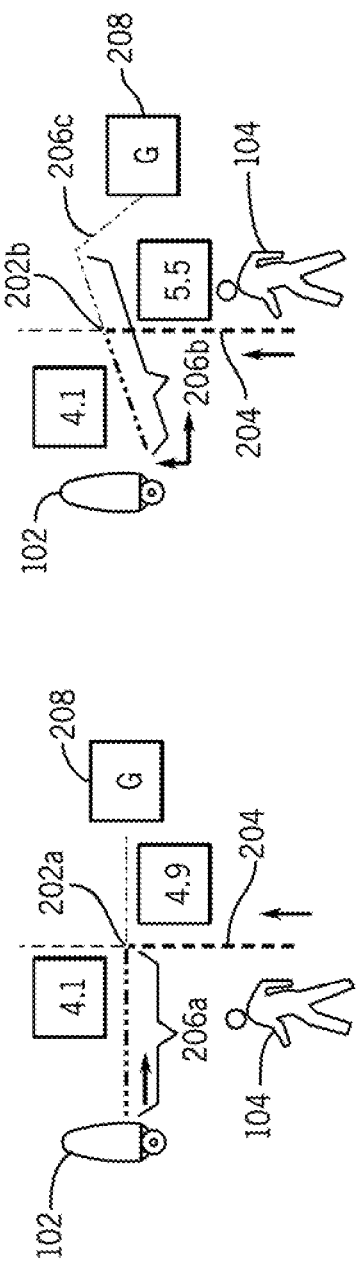
FIG. 2A
FIG. 2B
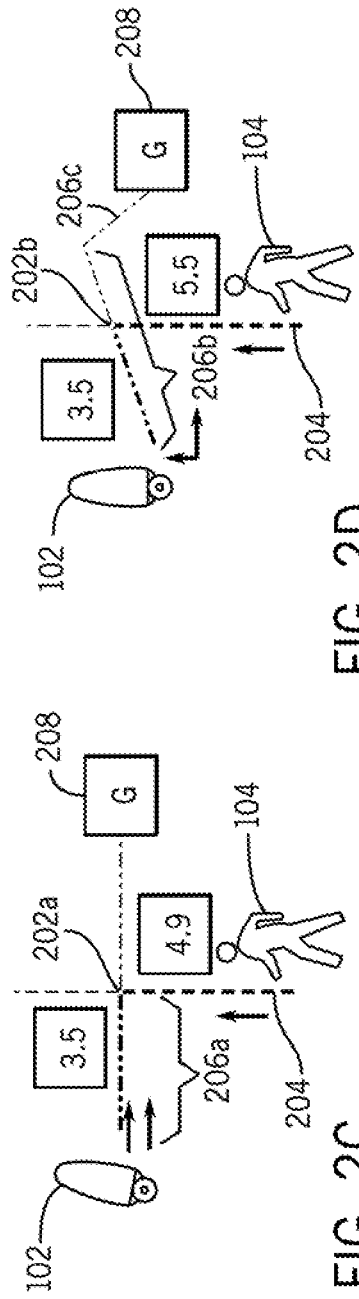
FIG. 2C
FIG. 2D

US 11,868,132 B2

SYSTEM AND METHOD FOR IMPLEMENTING PEDESTRIAN AVOIDANCE STRATEGIES FOR A MOBILE ROBOT

CROSS-REFERENCE TO RELATED APPLICATION

This application claims priority to U.S. Provisional Application Ser. No. 62/809,178 filed on Feb. 22, 2019, which is expressly incorporated herein by reference.

BACKGROUND

Much of early research on mobile robot navigation within crowded environments focuses on planning a collision-free path among moving obstacles such as pedestrians. However, while some current navigational techniques may be utilized to plan physically safe paths for a mobile robot, these techniques may not account for pedestrian comfort with respect to physical distances between the mobile robot and the pedestrians. For example, based on the utilization of some navigational techniques, mobile robots may come in an uncomfortably close proximity to the pedestrians which may cause discomfort on part of the pedestrians.

BRIEF DESCRIPTION

According to one aspect, a computer-implemented method for implementing pedestrian avoidance strategies for a mobile robot that includes receiving position data of a pedestrian and the mobile robot from systems of the mobile robot and estimating positions of the pedestrian and the mobile robot based on the position data. The computer-implemented method also includes determining an expected intersection point of paths of the pedestrian and the mobile robot and an estimated time for the pedestrian to reach and cross the expected intersection point of the paths. The computer-implemented method further includes implementing a pedestrian avoidance strategy based on the positions of the pedestrian and the mobile robot and the expected point in time when the pedestrian will reach and cross the expected intersection point of the paths.

According to another aspect, a system for implementing pedestrian avoidance strategies for a mobile robot that includes a memory storing instructions when executed by a processor cause the processor to receive position data of a pedestrian and the mobile robot from systems of the mobile robot and estimate positions of the pedestrian and the mobile robot based on the position data. The instructions also cause the processor to determine an expected intersection point of paths of the pedestrian and the mobile robot and an estimated time for the pedestrian to reach and cross the expected intersection point of the paths. The instructions further cause the processor to implement a pedestrian avoidance strategy based on the positions of the pedestrian and the mobile robot and the expected point in time when the pedestrian will reach and cross the expected intersection point of the paths.

According to yet another aspect, a non-transitory computer readable storage medium storing instructions that when executed by a computer, which includes a processor perform a method that includes receiving position data of a pedestrian and a mobile robot from systems of the mobile robot and estimating positions of the pedestrian and the mobile robot based on the position data. The method also includes determining an expected intersection point of paths of the pedestrian and the mobile robot and an expected estimated time for the pedestrian to reach and cross the expected intersection point of the paths. The method further includes implementing a pedestrian avoidance strategy based on the positions of the pedestrian and the mobile robot and the expected point in time when the pedestrian will reach and cross the expected intersection point of the paths.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 2A is an illustrated example of an implementation of a baseline pedestrian avoidance strategy according to an exemplary embodiment of the present disclosure;

FIG. 2B is an illustrated example of an implementation of a curve pedestrian avoidance strategy according to an exemplary embodiment of the present disclosure;

FIG. 2C is an illustrated example of an implementation of an accelerate pedestrian avoidance strategy according to an exemplary embodiment of the present disclosure;

FIG. 2D is an illustrated example of an implementation of a curve accelerate pedestrian avoidance strategy according to an exemplary embodiment of the present disclosure;

DETAILED DESCRIPTION

Figure 1:
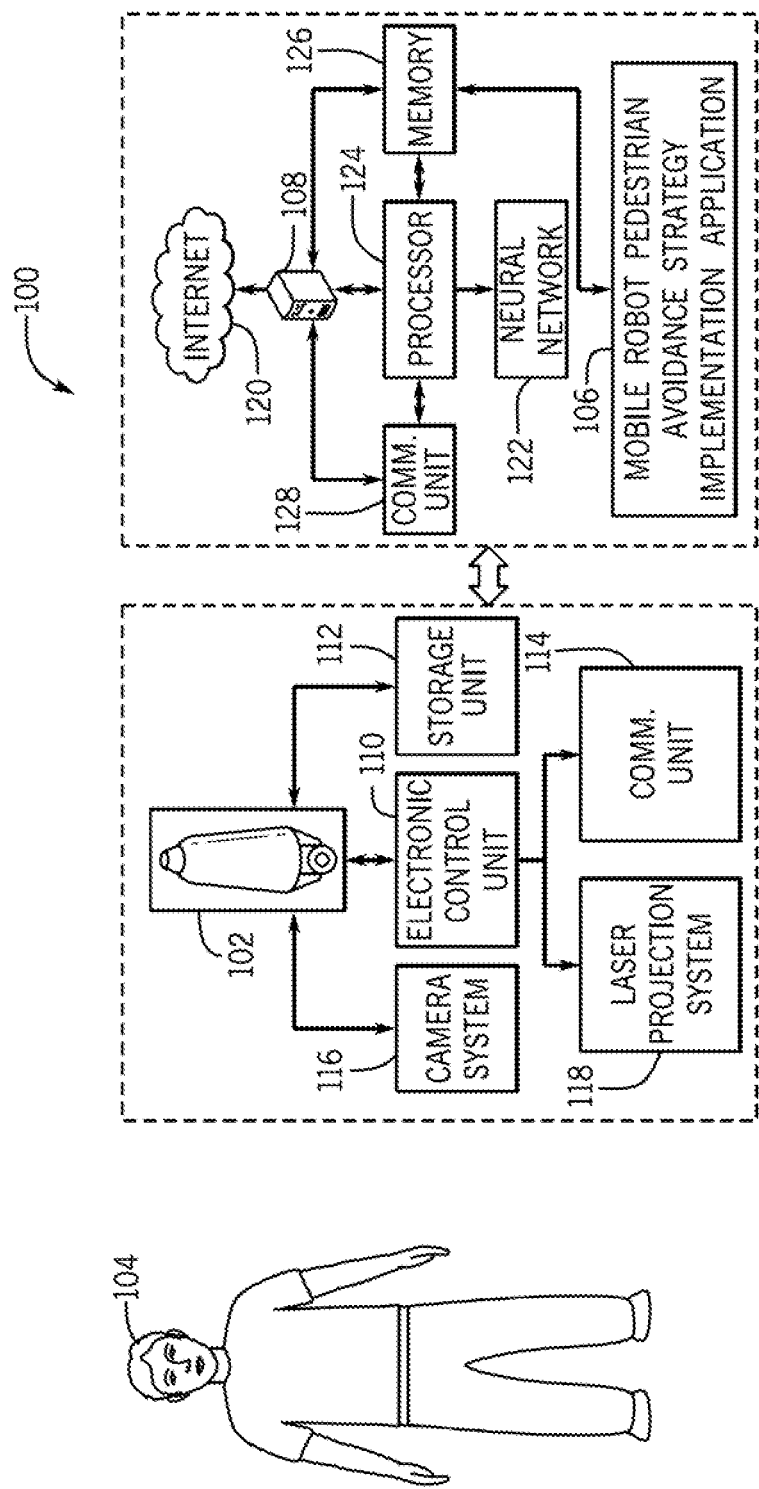
FIG. 1 is a high-level schematic view of an illustrative system for implementing pedestrian avoidance strategies for a mobile robot according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview:

Referring now to the drawings, wherein the showings are for purposes of illustrating one or more exemplary embodiments and not for purposes of limiting same, FIG. 1 is a high-level schematic view of an illustrative system 100 for implementing pedestrian avoidance strategies for a mobile robot 102 according to an exemplary embodiment of the present disclosure. The components of the system 100, as well as the components of other systems and architectures discussed herein, may be combined, omitted or organized into different architectures for various embodiments.

In an exemplary embodiment of FIG. 1, the system 100 may include a plurality of mobile robots 102 that may interact within a surrounding environment of the mobile robots 102 with a plurality of pedestrians 104, however, for purposes of simplicity, this disclosure will describe the embodiments of the system 100 with respect to a single mobile robot 102 interacting within the surrounding environment of the mobile robot 102 with respect to a single pedestrian 104. Additionally, the components of the system 100 may be configured to implement strategies for the mobile robot 102 that may apply to one or more types of road users (not shown) in addition to the pedestrian 104 to thereby implement road user avoidance strategies for the mobile robot 102. However, for purposes of simplicity, this disclosure will describe the system 100 and its components with respect to the mobile robot 102 interacting within the surrounding environment of the mobile robot 102 with respect to the pedestrian 104.

In an exemplary embodiment, the system 100 may include a mobile robot pedestrian avoidance strategy implementation application (pedestrian avoidance application) 106 that may be executed by the mobile robot 102 and/or by an externally hosted server infrastructure (external server) 108 that may be configured to communicate with the mobile robot 102 to implement a pedestrian avoidance strategy for the mobile robot 102 when a path of travel of the mobile robot 102 is expected to intersect with a path of travel of the pedestrian 104. As shown in the illustrative examples of FIGS. 2A-2D, the pedestrian avoidance application 106 may implement one of a plurality of pedestrian avoidance strategies when a path of the mobile robot 102 is expected to intersect with the path of the pedestrian 104 at one or more periods of time.

In an exemplary embodiment, the plurality of pedestrian avoidance strategies may be implemented based on analysis of received position data of the pedestrian 104 and the mobile robot 102 from one or more measurement systems (described in detail below). With reference to FIG. 1 and FIG. 2A, the pedestrian avoidance application 106 may analyze the position data and may estimate an intersection point 202a of the mobile robot 102 and the pedestrian 104 and an expected point in time when mobile robot 102 and the pedestrian 104 will pass the intersection point 202a based on the current path 206a of the mobile robot 102 and the path 204 of the pedestrian 104.

As discussed below, the pedestrian avoidance application 106 may be configured to utilize machine learning/deep learning techniques and electronic analysis of various data points to select and implement one or more pedestrian avoidance strategies of the plurality of pedestrian avoidance strategies that are to be implemented based on the positions of the pedestrian 104 and the mobile robot 102 and the expected point in time when the pedestrian 104 and/or the mobile robot 102 will reach and cross the intersection point 202a. The pedestrian avoidance application 106 may be configured to thereby implement the selected pedestrian avoidance strategy to control the mobile robot 102 to autonomously reach a goal 208 (e.g., end goal destination) in a manner that avoids concurrent overlap between the path 206a of the mobile robot 102 and the path 204 of the pedestrian 104 based on the implementation of the particular pedestrian avoidance strategy.

In particular, the pedestrian avoidance application 106 may be configured to analyze the plurality of pedestrian avoidance strategies (discussed in detail below) to implement one or more of the strategies based on the positions of the pedestrian 104 and the mobile robot 102 within the surrounding environment of the mobile robot 102 with respect to the expected intersection point 202a of the path 204 of the pedestrian 104 and the path 206a of the mobile robot 102. The application 106 may accordingly enhance a perceived safety and comfort of the pedestrian 104 within the human-robot intersection scenario. For example, the mobile robot 102 may be controlled to autonomously operate to pass the path 204 of the pedestrian 104 in a manner that may allow the pedestrian 104 to feel comfortable with respect to a physical distance (e.g., space) between the mobile robot 102 and the pedestrian 104.

With continued reference to FIG. 1, the mobile robot 102 may include a plurality of components that may include, but may not be limited to, an electronic control unit (ECU) 110, a storage unit 112, a communication unit 114, a camera system 116, and a laser projection system 118. In an exemplary embodiment, the ECU 110 may execute one or more applications, operating systems, robot system and subsystem executable instructions, among others. In one or more embodiments, the ECU 110 may include a microprocessor, one or more application-specific integrated circuit(s) (ASIC), or other similar devices. The ECU 110 may also include an internal processing memory, an interface circuit, and bus lines for transferring data, sending commands, and communicating with the plurality of components of the mobile robot 102.

The ECU 110 may include a respective communication device (not shown) for sending data internally to components of the mobile robot 102 and communicating with externally hosted computing systems (e.g., external to the mobile robot 102). Generally the ECU 110 may be operably connected to the storage unit 112 and may communicate with the storage unit 112 to execute one or more applications, operating systems, vehicle systems and subsystem user interfaces, and the like that are stored on the storage unit 112. The storage unit 112 may be configured to store data associated with computer-implemented instructions associated with each of the plurality of pedestrian avoidance strategies that may be implemented by the pedestrian avoidance application 106.

In one or more embodiments, the ECU 110 may be configured to operably control the plurality of components of the mobile robot 102. The ECU 110 may also provide one or more commands to one or more control units (not shown) of the mobile robot 102 including, but not limited to, a motor/engine control unit, a braking control unit, a turning control unit, a transmission control unit, and the like to control the mobile robot 102 to be autonomously operated. As discussed below, the ECU 110 may autonomously control the mobile robot 102 based on one or more pedestrian avoidance strategies that are selected and implemented by the pedestrian avoidance application 106 based on the positions of the pedestrian 104 and the mobile robot 102 with respect to the intersection point 202a and the expected point in time when the pedestrian 104 will pass the intersection point 202a.

In one or more embodiments, the storage unit 112 may configured to store data, for example, one or more images, videos, one or more sets of image coordinates that may be provided by the camera system 116 and/or one or more sets of LiDAR coordinates (e.g., LiDAR coordinates associated with the position of the pedestrian 104). In an exemplary embodiment, the camera system 116 of the mobile robot 102 may include one or more cameras that are positioned at one or more exterior portions of the mobile robot 102 to capture the surrounding environment of the mobile robot 102 (e.g., a vicinity of the mobile robot 102). The camera(s) of the camera system 116 may be positioned in a direction to capture the surrounding environment of the mobile robot 102 that includes areas located around (front/sides/behind) the mobile robot 102.

In one or more configurations, the one or more cameras of the camera system 116 may be disposed at external front, rear, and/or side portions of the including, but not limited to different portions of the bumpers, lighting units, body panels, and the like. The one or more cameras may be positioned on a respective planar sweep pedestal (not shown) that allows the one or more cameras to be oscillated to capture images of the surrounding environments of mobile robot 102.

In one embodiment, the camera system 116 may output image data that may be associated with untrimmed images/video of the surrounding environment of the mobile robot 102. The pedestrian avoidance application 106 may be configured to execute image logic (e.g., pre-trained computer logic) to analyze the image data and determine mobile robot based observations associated with the surrounding environment of the mobile robot 102. The pedestrian avoidance application 106 may be configured to analyze the image data using the image logic to classify and determine the position of one or more pedestrians that may be located within the surrounding environment of the mobile robot 102. Additionally, the pedestrian avoidance application 106 may be configured to analyze the image data using the image logic to classify and determine the position of one or more static objects, one or more dynamic objects, and/or one or more available pathways that may be included within the surrounding environment of the mobile robot 102.

In an exemplary embodiment, the ECU 110 may also be operably connected to the laser projection system 118 of the mobile robot 102. The laser projection system 118 may include one or more respective LiDAR transceivers (not shown). The one or more respective LiDAR transceivers of the respective laser projection system 118 may be disposed at external front, rear, and/or side portions of bumpers, body panels, lighting units, and the like of the mobile robot 102.

The one or more respective LiDAR transceivers may include one or more planar sweep lasers that include may be configured to oscillate and emit one or more laser beams of ultraviolet, visible, or near infrared light toward the surrounding environment of the mobile robot 102. The laser projection system 118 may be configured to receive one or more reflected laser waves based on the one or more laser beams emitted by the LiDAR transceivers. For example, one or more reflected laser waves may be reflected off of the pedestrian 104, one or more dynamic objects, one or more static objects, one or more boundaries (e.g., guardrails, walls) that may be located within the surrounding environment of the mobile robot 102.

In an exemplary embodiment, the laser projection system 118 may be configured to output LiDAR data that may be associated with the one or more reflected laser waves. The pedestrian avoidance application 106 may receive the LiDAR data communicated by the laser projection system 118 and may execute LiDAR logic (e.g., pre-trained computer logic) to analyze the LiDAR data and determine LiDAR based observations associated with the surrounding environment of the mobile robot 102. In particular, the pedestrian avoidance application 106 may be configured to analyze the LiDAR data using the LiDAR logic to classify and determine the position of one or more pedestrians that may be located within the surrounding environment of the mobile robot 102. Additionally, the pedestrian avoidance application 106 may be configured to analyze the LiDAR data using the LiDAR logic to classify and determine the position of one or more static objects, one or more dynamic objects, and/or one or more available pathways that may be included within the surrounding environment of the mobile robot 102.

In one embodiment, the communication unit 114 of the mobile robot 102 may be operably controlled by the ECU 110 of the mobile robot 102. The communication unit 114 may be operably connected to one or more transceivers (not shown) of the mobile robot 102. The communication unit 114 may be configured to communicate through an internet cloud 120 through one or more wireless communication signals that may include, but may not be limited to Bluetooth® signals, Wi-Fi signals, ZigBee signals, Wi-Max signals, and the like.

In one embodiment, the communication unit 114 may be configured to connect to the internet cloud 120 to send and receive communication signals to and from the external server 108. The external server 108 may host a neural network 122 that may be pre-trained with one or more data sets that may be analyzed to determine one or more relative positions of the pedestrian 104 with respect to the mobile robot 102, an estimated trajectory of the pedestrian 104, an estimated speed of the pedestrian 104, an estimated pathway of the pedestrian 104, an expected intersection point 202*a* between the pedestrian 104 and the mobile robot 102, and/or additional data associated with the pedestrian 104 and/or the mobile robot 102.

As discussed below, the pedestrian avoidance application 106 may be configured to communicate with the neural network 122 to determine the aforementioned information associated with the pedestrian 104 and/or the mobile robot 102 during a state of travel within the surrounding environment of the mobile robot 102. Such information may be utilized to select and implement one or more of the plurality of pedestrian avoidance strategies by the pedestrian avoidance application 106.

With continued reference to the external server 108, the processor 124 may be operably connected to a memory 126. The memory 126 may store one or more operating systems, applications, associated operating system data, application data, executable data, and the like. In one embodiment, the processor 124 may be configured to process information associated with the position of the mobile robot 102 and the pedestrian 104 at one or more time steps and may store associated data on the memory 126 to be analyzed by the neural network 122. For example, data associated with the position of the mobile robot 102 and the pedestrian 104 may be determined by the pedestrian avoidance application 106 for a plurality of time steps as the mobile robot 102 and the pedestrian 104 are traveling in the surrounding environment of the mobile robot 102. The pedestrian avoidance application 106 may store positional data points for the plurality of time steps on the memory 126 as the mobile robot 102 and the pedestrian 104 travel within the surrounding environment of the mobile robot 102. The stored data points may be further analyzed individually or in aggregation to select one or more of the plurality of pedestrian avoidance strategies to be implemented to control the mobile robot 102 to autonomously travel within the surrounding environment of the mobile robot 102.

In one embodiment, the processor 124 of the external server 108 may additionally be configured to communicate with a communication unit 128. The communication unit 128 may be configured to communicate through the internet cloud 120 through one or more wireless communication signals that may include, but may not be limited to Bluetooth® signals, Wi-Fi signals, ZigBee signals, Wi-Max signals, and the like. In one embodiment, the communication unit 128 may be configured to connect to the internet cloud 120 to send and receive communication signals to and from the mobile robot 102. In particular, the external server 108 may receive image data and LiDAR data that may be communicated by the mobile robot 102 based on the utilization of the camera system 116 and the laser projection system 118. As discussed below, such data may be utilized to determine positional data points associated with the positions of the pedestrian 104 and the mobile robot 102 that may be further evaluated to control the mobile robot 102 to autonomously travel within the surrounding environment of the mobile robot 102.

II. The Mobile Robot Pedestrian Avoidance Strategy Implementation Application and Related Methods The components of the pedestrian avoidance application 106 will now be described according to an exemplary embodiment and with reference to FIG. 1. In an exemplary embodiment, the pedestrian avoidance application 106 may be stored on the memory 126 and executed by the processor 124 of the external server 108. In another embodiment, the pedestrian avoidance application 106 may be stored on the storage unit 112 of the mobile robot 102 and may be executed by the ECU 110 of the mobile robot 102.

As discussed above, the pedestrian avoidance application 106 may be configured to implement one or more pedestrian avoidance strategies based on the positions of the pedestrian 104 and the mobile robot 102 with respect to the expected intersection point 202*a* of the paths 204, 206*a* and the expected point in time when the mobile robot 102 and the pedestrian 104 will reach and cross the expected intersection point 202*a* of their respective paths 204, 206*a*. The one or more pedestrian avoidance strategies may be implemented in a manner that may promote a reduce perception of crowding from the view point of the pedestrian 104 which may thereby promote a high level of safety and comfort from the pedestrian's point of view. In an exemplary embodiment, the plurality of pedestrian avoidance strategies may include, but may not be limited to a baseline strategy, a curve strategy, an accelerate strategy, and a curve and accelerate strategy.

In an exemplary embodiment, during implementation of the baseline pedestrian avoidance strategy, the mobile robot 102 may be autonomously controlled to maintain a constant speed in following its path 206*a* to thereby cross the expected intersection point 202*a* between the mobile robot 102 and the pedestrian 104 before the pedestrian 104 is expected to cross the expected intersection point. As shown in the illustrative example of FIG. 2A, in a situation where the mobile robot 102 is expected to cross the expected intersection point 202*a* before the pedestrian 104 crosses the expected intersection point 202*a* (based on the faster speed of the mobile robot 102), the pedestrian avoidance application 106 may implement the baseline pedestrian avoidance strategy. During implementation of the baseline pedestrian avoidance strategy, the mobile robot 102 may be autonomously controlled to maintain a constant speed in following its current path 206*a* to thereby cross the expected intersection point 202*a* before the pedestrian's path 204 to their goal 208.

As shown in an illustrative example of FIG. 2B and with continued reference to FIG. 2A, during implementation of the curve pedestrian avoidance strategy, the mobile robot 102 may be controlled to change its moving direction and consequently its current path 206*a* to a modified path 206*b* that enables the mobile robot 102 to turn away from the pedestrian 104 before (e.g., three seconds before) the mobile robot 102 is to cross the expected intersection point 202*a* between the mobile robot 102 and the pedestrian 104.

Stated differently, the mobile robot 102 may be autonomously controlled to deviate from a current path 206*a* of travel (e.g. straight path of travel) that the mobile robot 102 was traveling upon and may change its trajectory to thereby delay the pedestrian's passing timing with respect to the mobile robot 102. While utilizing this strategy, the mobile robot 102 may be further autonomously controlled to alter its trajectory after crossing a modified expected intersection point 202*b* by turning and following a new path 206*c* towards its goal 208. In other words, the mobile robot 102 may alter its modified path 206*b* to the new path 206*c* that allows the mobile robot 102 to reach its intended goal 208.

Accordingly, the mobile robot 102 may be autonomously controlled to deviate from a current path 206*a* (shown in FIG. 2A) to the modified path 206*b* that may allow the mobile robot 102 to cross a modified expected intersection point 202*b* between the mobile robot 102 and the pedestrian 104 in a similar amount of time (4.1 seconds) as during implementation of the baseline pedestrian avoidance strategy. Stated differently, the time at which the pedestrian 104 may pass the modified expected intersection point 202*b* will be delayed until after the mobile robot 102 reaches and crosses the modified expected intersection point 202*b*. As such, the implementation of the curve pedestrian avoidance strategy may delay the time at which the pedestrian 104 may reach and cross the modified expected intersection point 202*b* between the modified path 206*b* of the mobile robot 102 and the path 204 of the pedestrian 104.

In an exemplary embodiment, the accelerate pedestrian avoidance strategy may be utilized to autonomously control the mobile robot 102 to accelerate the speed of the mobile robot 102 to thereby accelerate through the expected intersection point 202*a* of the mobile robot 102 and the pedestrian 104 at a point in time that falls earlier than when utilizing the baseline pedestrian avoidance strategy. During implementation of the accelerate pedestrian avoidance strategy, the mobile robot 102 may maintain its current trajectory and current path to its goal 208. In some embodiments, in the circumstance that the estimated time to reach the expected intersection point 202*a* between the mobile robot 102 and the pedestrian 104 is equal for both the mobile robot 102 and the pedestrian 104, the mobile robot 102 may be autonomously controlled to accelerate to cross the expected intersection point 202*a* before the pedestrian 104 crosses the expected intersection point 202*a*.

Also, in a circumstance that the estimated time to reach the expected intersection point 202*a* of the mobile robot 102 is less than the estimated time to reach the expected intersection point 202*a* for the pedestrian 104, the application 106 may implement the accelerate pedestrian avoidance strategy to accelerate the mobile robot 102 to cross the expected intersection point 202*a* at a point in time before the pedestrian 104 crosses the expected intersection point 202*a*. Alternatively, in a circumstance that the estimated time to reach the expected intersection point 202*a* of the mobile robot 102 is less than the estimated time to reach the expected intersection point 202*a* for the pedestrian 104, the application 106 may implement the baseline pedestrian avoidance strategy, as discussed above.

As an illustrative example with reference to FIG. 2C, the mobile robot 102 may be autonomously controlled to accelerate while maintaining its current path 206*a* to cross the expected intersection point 202*a* before the pedestrian 104 crosses the expected intersection point 202*a*. In some cases, the mobile robot 102 may be autonomously controlled to accelerate to cross the expected intersection point 202*a* earlier than when implementing the baseline pedestrian avoidance strategy. Accordingly, as shown, the mobile robot 102 may be accelerated to cross the expected intersection point 202*a* in 3.5 seconds before the pedestrian 104 crosses the expected intersection point 202*a* in 4.9 seconds. As compared to the baseline pedestrian avoidance strategy, the mobile robot 102 may cross the expected intersection point 202*a* in less time (3.5 seconds, shown in FIG. 2C) than if the pedestrian avoidance application 106 implements the baseline pedestrian avoidance strategy (4.1 seconds, shown in FIG. 2A).

In one or more embodiments, the pedestrian avoidance application 106 may be configured to implement the curve and accelerate pedestrian avoidance strategy, as illustrated in FIG. 2D. Upon implementing the curve and accelerate pedestrian avoidance strategy, the mobile robot 102 may be autonomously controlled to change its moving direction and may travel on a modified path 206b to turn away from the pedestrian 104 before (e.g., three seconds before) the mobile robot 102 is to cross a modified expected intersection point 202b between the mobile robot 102 and the pedestrian 104. The mobile robot 102 may also be controlled to simultaneously accelerate to increase speed after changing its trajectory to cross the modified expected intersection point 202b at a faster amount of time than if the curve pedestrian avoidance strategy (shown in FIG. 2B) were to be implemented.

Stated differently, during implementation of the curve accelerate pedestrian avoidance strategy, the mobile robot 102 may be autonomously controlled to deviate from a current path 206a of travel (e.g. straight path of travel, shown in FIG. 2C) by changing its trajectory to turn away from the pedestrian 104 to follow the modified path 206b (shown in FIG. 2D) while accelerating to pass through the modified expected intersection point 202b at a point in time that falls earlier than when utilizing the curve pedestrian avoidance strategy. In one embodiment, the mobile robot 102 may be autonomously controlled to cross the modified expected intersection point 202b between the mobile robot 102 and the pedestrian 104 in a similar amount of time that the mobile robot 102 would have utilized to cross the (unmodified) expected intersection point 202a between the mobile robot 102 and the pedestrian 104 during implementation of the accelerate pedestrian avoidance strategy.

As an illustrative example, during implementation of the curve accelerate pedestrian avoidance strategy, the mobile robot 102 may be autonomously controlled to alter its path 206a to a modified path 206b to the goal 208. The mobile robot 102 may thereby change its trajectory to turn away from the pedestrian 104. With reference to FIGS. 2C and 2D, the mobile robot 102 may also be autonomously controlled to accelerate to cross the modified expected intersection point 202b of the mobile robot 102 and the pedestrian 104 in a similar amount of time of 3.5 seconds to the amount of time the mobile robot 102 would have utilized to cross the original expected intersection point 202a during implementation of the accelerate pedestrian avoidance strategy. As represented in FIG. 2D, during implementation of the curve accelerate strategy, the mobile robot 102 may be autonomously controlled to alter its trajectory after crossing the modified expected intersection point 202b by turning towards its goal 208. In other words, the mobile robot 102 may alter its modified path 206b to a new path 206c that allows the mobile robot 102 to reach its intended goal 208.

With reference to FIGS. 2A, 2B, 2C, and 2D, during implementation of the curve accelerate pedestrian avoidance strategy, the mobile robot 102 will alter its path 206a to a modified path 206b as is the case during implementation of the curve pedestrian avoidance strategy thereby modifying the expected intersection point 202a to the modified expected intersection point 202b between the mobile robot 102 and the pedestrian 104. The mobile robot 102 will also accelerate and increase its speed to cross the modified expected intersection point 202b in a similar amount of time (3.5 seconds) as during implementation of the accelerate pedestrian avoidance strategy. Upon crossing the modified expected intersection point 202b, the mobile robot 102 will be autonomously controlled to alter its trajectory once again to turn and follow the new path 206c to reach its intended goal 208 in a similar manner as followed during implementation of the curve pedestrian avoidance strategy.

Figure 3:
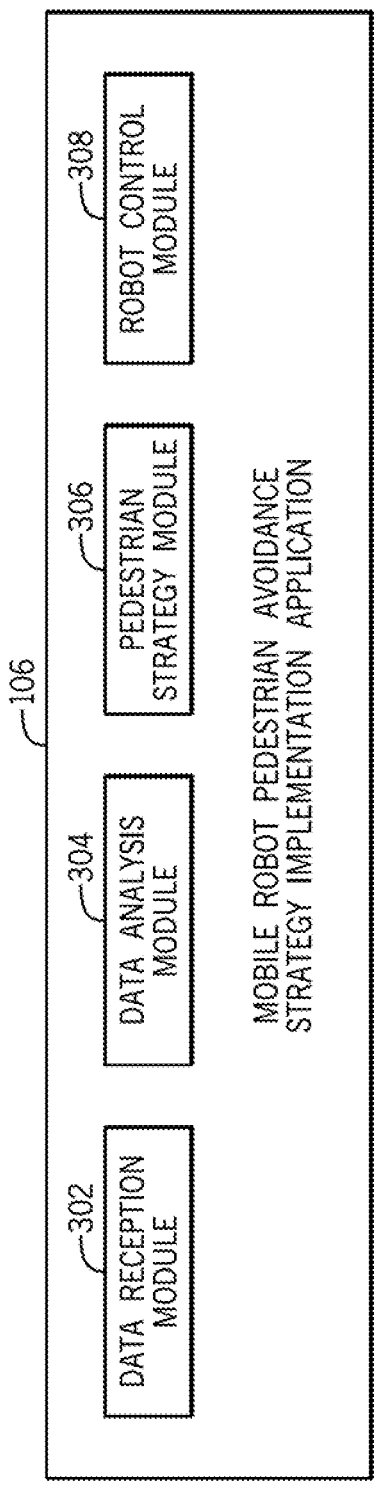
FIG. 3 is a schematic view of modules of a mobile robot pedestrian avoidance strategy implementation application (pedestrian avoidance application) according to an exemplary embodiment of the present disclosure.

The general functionality of the pedestrian avoidance application 106 will now be discussed. FIG. 3 is a schematic overview of a plurality of modules 302-306 of the pedestrian avoidance application 106 according to an exemplary embodiment of the present disclosure. In an exemplary embodiment, the pedestrian avoidance application 106 may include a data reception module 302, a data analysis module 304, a pedestrian avoidance strategy implementation module (pedestrian strategy module) 306, and a mobile robot control module (robot control module) 308. However, it is to be appreciated that the pedestrian avoidance application 106 may include one or more additional modules and/or sub-modules that are included in addition to the modules 302-308.

In an exemplary embodiment, the data reception module 302 may be configured to communicate with systems in the form of the camera system 116 and the laser projection system 118 to receive image data and LiDAR data that may be output by the respective systems 116, 118. The image data and LiDAR data may include data that pertains to details associated with the surrounding environment of the mobile robot 102 that may be captured during one or more time steps. In some embodiments, the data reception module 302 may be configured to aggregate the image data and LiDAR data captured at one or more simultaneous time steps to thereby be analyzed as fused environment data that includes aggregated image and LiDAR based observations of the surrounding environment of the mobile robot 102.

As discussed above, the image data and LiDAR data may provide mobile robot based observations associated with the surrounding environment of the mobile robot 102. In particular, the data reception module 302 may be configured to analyze the image data and/or the LiDAR using the image logic and/or LiDAR to classify and determine the position of the pedestrian 104 that may be located within the surrounding environment of the mobile robot 102. Additionally, the data reception module 302 may be configured to analyze the image data and/or the LiDAR data to classify and determine the position of one or more static objects, one or more dynamic objects, and/or one or more available pathways that may be included within the surrounding environment of the mobile robot 102. Upon classifying and determining positions associated with the surrounding environment of the mobile robot 102, the data reception module 302 may communicate respective data to the data analysis module 304.

In an exemplary embodiment, the data analysis module 304 may be configured to analyze the classified observations and positions and may extract information (e.g., x, y, z coordinates) associated with the position of the mobile robot 102 and the pedestrian 104 within the surrounding environment of the mobile robot 102 at one or more time steps. In some configurations, the data analysis module 304 may access the memory 126 on the external server 108 and may store positional data associated with the positions of the mobile robot 102 and the pedestrian 104 within the surrounding environment at each time step of the one or more time steps captured (sensed) within the image data and/or the LiDAR data within the memory 126 to be analyzed by the neural network 122. In one or more embodiments, the data analysis module 304 may communicate the neural network 122 to access the memory 126 and retrieve positional data associated with the mobile robot 102 and the positional data associated with the pedestrian 104 stored with respect to the one or more time steps.

As discussed above, the neural network 122 may be pre-trained with one or more data sets that may be analyzed to determine one or more relative positions of the pedestrian 104 with respect to the mobile robot 102, an estimated trajectory of the pedestrian 104, an estimated velocity of the pedestrian 104, a path 204 of the pedestrian 104, an expected intersection point 202a between the pedestrian 104 and the mobile robot 102, and/or additional data associated with the pedestrian 104 and/or the mobile robot 102.

The data analysis module 304 may communicate with the neural network 122 to determine the aforementioned determinations of the neural network 122. In particular, the data analysis module 304 may communicate with the neural network 122 to determine the aforementioned data points that may be utilized to estimate one or more intersection points between the mobile robot 102 and the pedestrian 104 based on one or more positions and trajectories of the mobile robot 102 and the pedestrian 104. The data analysis module 304 may thereby communicate respective data to the pedestrian strategy module 306.

In an exemplary embodiment, as the mobile robot 102 is being autonomously controlled to move towards its goal 208, the pedestrian strategy module 306 may be configured to analyze the data communicated by the data analysis module 304 with respect to the positions, estimated trajectory, and speed of the pedestrian 104 to thereby estimate a time $t_h$ that the pedestrian 104 may cross an expected intersection point 202a $p_{int}$ of the current path 206a of the mobile robot 102 and the path 204 of the pedestrian 104. The pedestrian strategy module 306 may be configured to continue to update the estimated time $t_h$ and may continually store the updated estimate time $t_h$ upon the memory 126 as the pedestrian 104 travels towards the expected intersection point 202a $p_{int}$ until an intersection interaction decision time $t_h - T_{int}$ is reached, where $T_{int}$ is a predetermined interaction time.

Upon reaching the intersection interaction decision time $t_h - T_{int}$ the pedestrian strategy module 306 may be configured to select one of the plurality of pedestrian avoidance strategies based on the estimate time $t_h$ that the pedestrian may cross the intersection point 202a $p_{int}$ and an estimated time that the mobile robot 102 may cross the intersection point 202a $p_{int}$ to reach its goal 208. Accordingly, at this time the trajectory of the mobile robot 102 may be generated according to the selected pedestrian avoidance strategy in a respective manner.

In one embodiment, the pedestrian strategy module 306 may estimate the time that may be taken for the mobile robot 102 to reach and cross the intersection point 202a to $t_r = t_h - t_s$ when implementing the baseline pedestrian avoidance strategy and the curve pedestrian avoidance strategy, where $T_s$ and $T_A$ are predefined parameters. The pedestrian strategy module 306 may estimate the time that may be taken for the mobile robot 102 to reach and cross the intersection point 202a to $t_r = t_h - T_s - T_A$ for the accelerate pedestrian avoidance strategy and the curve accelerate pedestrian avoidance strategy, where $T_s$ and $T_A$ are predefined parameters. The pedestrian strategy module 306 may also be configured to output $p_{int} + T_A v_b$ where $v_h$ is the walking velocity of the pedestrian 104.

In one embodiment, the estimated trajectory of the pedestrian 104 may be tracked based on the image data and/or the LiDAR data. The pedestrian strategy module 306 may execute velocity tracking as a first-order dynamical instructions parameterized by $k_p$ and $k_d$: $\dot{v} = k_p(v_d - v) - k_d$ where $v_d$ is a velocity command sent to the pedestrian strategy module 306 and v is a current velocity.

In one or more embodiments, the pedestrian strategy module 306 may thereby analyze the estimated time that the pedestrian 104 may reach and cross the expected intersection point 202a, the position of the pedestrian 104 with respect to the position of the mobile robot 102, a current estimated time for the mobile robot 102 to reach and cross the expected intersection point 202a at a current speed of the mobile robot 102, and the plurality of pedestrian avoidance strategies to select and implement one or more pedestrian avoidance strategies.

In one embodiment, with reference again to FIG. 2A, the pedestrian strategy module 306 may select and implement the baseline pedestrian avoidance strategy based on the positions of the mobile robot 102 and the pedestrian 104 and the estimated time to reach and cross the expected intersection point 202a. Upon implementing the baseline pedestrian avoidance strategy, the pedestrian strategy module 306 may communicate data pertaining to the implemented baseline pedestrian avoidance strategy to the robot control module 308 of the pedestrian avoidance application 106.

In one embodiment, the robot control module 308 may thereby communicate instructions to implement the baseline pedestrian avoidance strategy to the ECU 110 of the mobile robot 102 to autonomously control the mobile robot 102 according to the baseline pedestrian avoidance strategy. The ECU 110 may thereby communicate instructions to one or more components of the mobile robot 102 to autonomously control the mobile robot 102 to maintain a constant speed in following its path 206a to thereby cross the expected intersection point 202a between the mobile robot 102 and the pedestrian 104 before the pedestrian 104 is expected to cross the expected intersection point 202a.

In another embodiment, with reference again to FIGS. 2A and 2B, the pedestrian strategy module 306 may select and implement the curve pedestrian avoidance strategy in situations based on the positions of the mobile robot 102 and the pedestrian 104 and the estimated time to reach and cross the expected intersection point 202a. Upon implementing the curve pedestrian avoidance strategy, the pedestrian strategy module 306 may communicate data pertaining to the implemented curve pedestrian avoidance strategy to the robot control module 308.

In one embodiment, the robot control module 308 may thereby communicate instructions to implement the curve pedestrian avoidance strategy to the ECU 110 of the mobile robot 102 to autonomously control the mobile robot 102 according to the curve pedestrian baseline avoidance strategy. The ECU 110 may thereby communicate instructions to one or more components of the mobile robot 102 to autonomously control the mobile robot 102 to deviate from a current path 206a (shown in FIG. 2A) to a modified path 206b (shown in FIG. 2B) that may allow the mobile robot 102 to cross a modified expected intersection point 202b between the mobile robot 102 and the pedestrian 104 in a similar amount of time (4.1 seconds) as during implementation of the baseline pedestrian avoidance strategy. Accordingly, the time at which the pedestrian 104 may pass the modified expected intersection point 202b will be delayed until after the mobile robot 102 reaches and crosses the modified expected intersection point 202b.

In one or more embodiments, with reference again to FIGS. 2A and 2C, the pedestrian strategy module 306 may select and implement the accelerate pedestrian avoidance strategy in situations based on the on the positions of the mobile robot 102 and the pedestrian 104 and the estimated time to reach and cross the expected intersection point 202*a*. Upon implementing the accelerate pedestrian avoidance strategy, the pedestrian strategy module 306 may communicate data pertaining to the accelerate pedestrian avoidance strategy to the robot control module 308.

In one embodiment, the robot control module 308 may thereby communicate instructions to implement the accelerate pedestrian avoidance strategy to the ECU 110 of the mobile robot 102 to autonomously control the mobile robot 102 according to the accelerate pedestrian avoidance strategy. The ECU 110 may thereby communicate instructions to one or more components of the mobile robot 102 to autonomously control the mobile robot 102 to accelerate while maintaining its current path 206*a* to cross the expected intersection point 202*a* before the pedestrian 104 crosses the expected intersection point 202*a*.

Accordingly, the mobile robot 102 may be accelerated to cross the expected intersection well before the pedestrian 104 crosses the expected intersection. As compared to the baseline pedestrian avoidance strategy, the mobile robot 102 may cross the expected intersection point 202*a* in less time (3.5 seconds, shown in FIG. 2C) than if the pedestrian avoidance application 106 implements the baseline pedestrian avoidance strategy (4.1 seconds, shown in FIG. 2A).

In some embodiments, with reference again to FIG. 2A and FIG. 2D, the pedestrian strategy module 306 may select and implement the curve accelerate pedestrian avoidance strategy in certain situations based on the positions of the mobile robot 102 and the pedestrian 104 and the estimated time to reach and cross the expected intersection point 202*a*. Upon implementing the curve accelerate pedestrian avoidance strategy, the pedestrian strategy module 306 may communicate data pertaining to the implemented curve pedestrian avoidance strategy to the robot control module 308.

In one embodiment, the robot control module 308 may thereby communicate instructions to implement the curve accelerate pedestrian avoidance strategy to the ECU 110 of the mobile robot 102 to autonomously control the mobile robot 102 according to the curve accelerate pedestrian avoidance strategy. The ECU 110 may thereby communicate instructions to one or more components of the mobile robot 102 to autonomously control the mobile robot to modify its current path 206*a* (shown in FIG. 2A) to a modified path 206*b* (shown in FIG. 2D) to its goal 208. The mobile robot 102 may thereby change its trajectory to turn away from the pedestrian 104 and may accelerate to cross the modified expected intersection point 202*b* of the mobile robot 102 and the pedestrian 104 in a similar amount of time (e.g., 3.5 seconds to the amount of time the mobile robot 102 would have utilized to cross the original expected intersection point 202*a* during implementation of the accelerate pedestrian avoidance strategy.

As represented in FIG. 2D, during implementation of the curve accelerate strategy, the mobile robot 102 may be autonomously controlled to alter its trajectory after crossing the modified expected intersection point 202*b* by turning towards its goal 208. In other words, the mobile robot 102 may once again alter its modified path 206*b* to a new path 206*c* that allows the mobile robot 102 to reach its intended goal 208.

Figure 4:
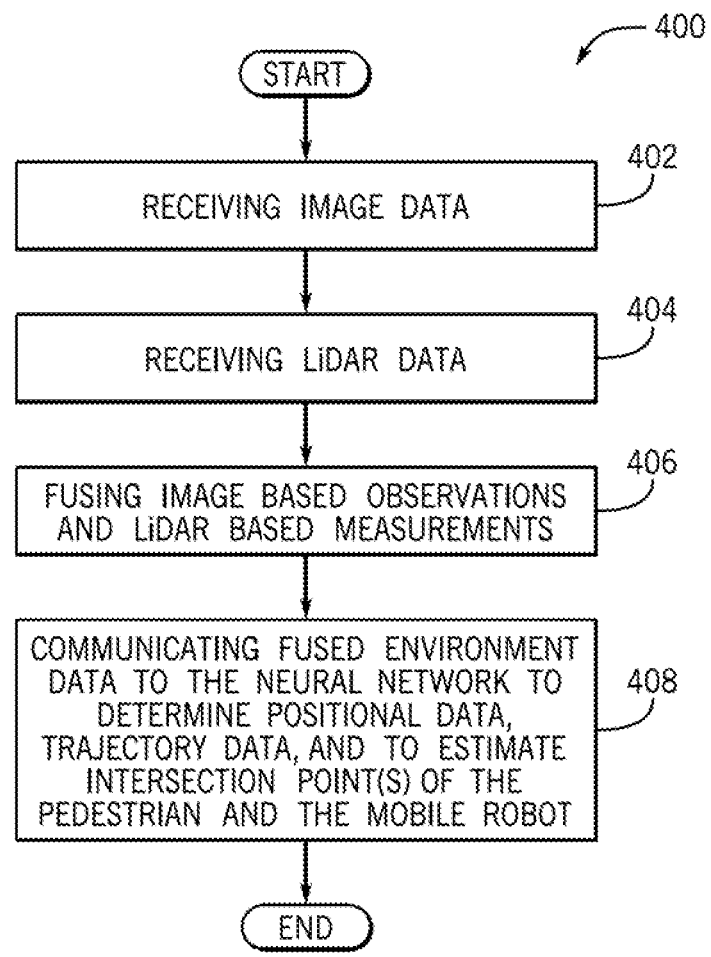
FIG. 4 is a process flow diagram of a method for receiving data associated with the surrounding environment of the mobile robot and determining data associated with the mobile robot and the pedestrian traveling within the surrounding environment according to an exemplary embodiment of the present disclosure.

FIG. 4 is a process flow diagram of a method 400 for receiving data associated with the surrounding environment of the mobile robot 102 and determining data associated with the mobile robot 102 and the pedestrian 104 traveling within the surrounding environment according to an exemplary embodiment of the present disclosure. FIG. 4 will be described with reference to the components of FIG. 1, FIG. 2, and FIG. 3, through it is to be appreciated that the method of FIG. 4 may be used with other systems/components. In an exemplary embodiment, the method 400 may begin at block 402, wherein the method 400 may include receiving image data.

In one embodiment, the data reception module 302 may communicate with the camera system 116 to collect untrimmed images/video of the surrounding environment of the mobile robot 102. The untrimmed images/video may include 360 degree external views of the surrounding environment of the mobile robot 102. In some circumstances, such views may include one or more pedestrians that may be located within the surrounding environment of the mobile robot 102. Additionally, such views may include one or more static objects, one or more dynamic objects, and/or one or more available pathways that may be included within the surrounding environment of the mobile robot 102.

In one embodiment, the data reception module 302 may execute image logic (e.g., pre-trained computer logic) to analyze the image data and determine mobile robot based observations associated with the surrounding environment of the mobile robot 102. In particular, the data reception module 302 may be configured to analyze the image data using the image logic to classify and determine the positions of one or more pedestrians that may be located within the surrounding environment of the mobile robot 102. Additionally, the data reception module 302 may be configured to analyze the image data using the image logic to classify and determine the positions of one or more static objects, one or more dynamic objects, and/or one or more available pathways that may be included within the surrounding environment of the mobile robot 102.

The method 400 may proceed to block 404, wherein the method 400 may include receiving LiDAR data. In an exemplary embodiment, the data reception module 302 may be configured to communicate with the laser projection system 118 of the mobile robot 102 to collect LiDAR data that includes LiDAR based observations from the mobile robot 102. The LiDAR based observations may indicate the location, range, and positions of one or more pedestrians that may be located within the surrounding environment of the mobile robot 102. Additionally, the LiDAR based observations may indicate the location, range, and positions of one or more static objects, one or more dynamic objects, and/or one or more available pathways that may be included within the surrounding environment of the mobile robot 102.

In one embodiment, the data reception module 302 may execute LiDAR logic (e.g., pre-trained computer logic) to analyze the LiDAR data and determine mobile robot based observations associated with the surrounding environment of the mobile robot 102. In particular, the data reception module 302 may be configured to analyze the LiDAR data using the LiDAR logic to classify and determine the positions of one or more pedestrians that may be located within the surrounding environment of the mobile robot 102. Additionally, the data reception module 302 may be configured to analyze the LiDAR data using the LiDAR logic to classify and determine the position of one or more static objects, one or more dynamic objects, and/or one or more available pathways that may be included within the surrounding environment of the mobile robot 102.

The method 400 may proceed to block 406, wherein the method 400 may include fusing image based observations and LiDAR based measurements. In an exemplary embodiment, upon analyzing the image data and the LiDAR data, the data reception module 302 may be configured to communicate the classifications of the pedestrian 104 (and additional pedestrians), one or more static objects, one or more dynamic objects, and the position of the pedestrian 104 with respect to the mobile robot 102 to the data analysis module 304. In one or more embodiments, the data analysis module 304 may be configured to conduct multimodal fusion of the image based observations determined from the image data and the LiDAR based measurements determined from the LiDAR data. The data analysis module 304 may thereby aggregate the image based observations and LiDAR based measurements into a fused environment data that may provide an image based and LiDAR based representation of the surrounding environment of the mobile robot 102.

The method 400 may proceed to block 408, wherein the method 400 may include communicating fused environment data to the neural network 122 to determine positional data, trajectory data, and to estimate intersection point(s) of the pedestrian 104 and the mobile robot 102. In an exemplary embodiment, the data analysis module 304 may be configured to communicate with the external server 108 to access the neural network 122. Upon accessing the neural network 122, the data analysis module 304 may be configured to communicate the fused environment data to the neural network 122.

The neural network 122 may execute machine learning/deep learning artificial intelligence capabilities to evaluate the fused environment data against pre-trained datasets and may output one or more relative positions of the pedestrian 104 with respect to the mobile robot 102, an estimated trajectory of the pedestrian 104, an estimated speed of the pedestrian 104, a path 204 of the pedestrian 104, an expected intersection point 202a between the pedestrian 104 and the mobile robot 102, and/or additional data associated with the pedestrian 104 and/or the mobile robot 102. The data analysis module 304 may communicate with the neural network 122 to determine the aforementioned data points that may be utilized to estimate respective times for the mobile robot 102 and the pedestrian 104 to reach the intersection point 102a between their paths 204, 206a. The data analysis module 304 may thereby communicate respective data to the pedestrian strategy module 306.

In an alternate embodiment, upon accessing the neural network 122, the data analysis module 304 may be configured to communicate the image based observations based on the image data (e.g., separately/independently from the LiDAR based observations) and/or the LiDAR based observations (e.g., separately/independently from the image based observations) based on the LiDAR data to the neural network 122. The neural network 122 may execute machine learning/deep learning artificial intelligence capabilities to evaluate the image based observations and/or the LiDAR based observations against pre-trained datasets and may output one or more relative positions of the pedestrian 104 with respect to the mobile robot 102, an estimated trajectory of the pedestrian 104, an estimated speed of the pedestrian 104, a path 204 of the pedestrian 104, an expected intersection point 202a between the pedestrian 104 and the mobile robot 102, and/or additional data associated with the pedestrian 104 and/or the mobile robot 102. The data analysis module 304 may communicate with the neural network 122 to determine the aforementioned data points that may be utilized to estimate respective times for the mobile robot 102 and the pedestrian 104 to reach the intersection point 102a between their paths 204, 206a. The data analysis module 304 may thereby communicate respective data to the pedestrian strategy module 306.

Figure 5:
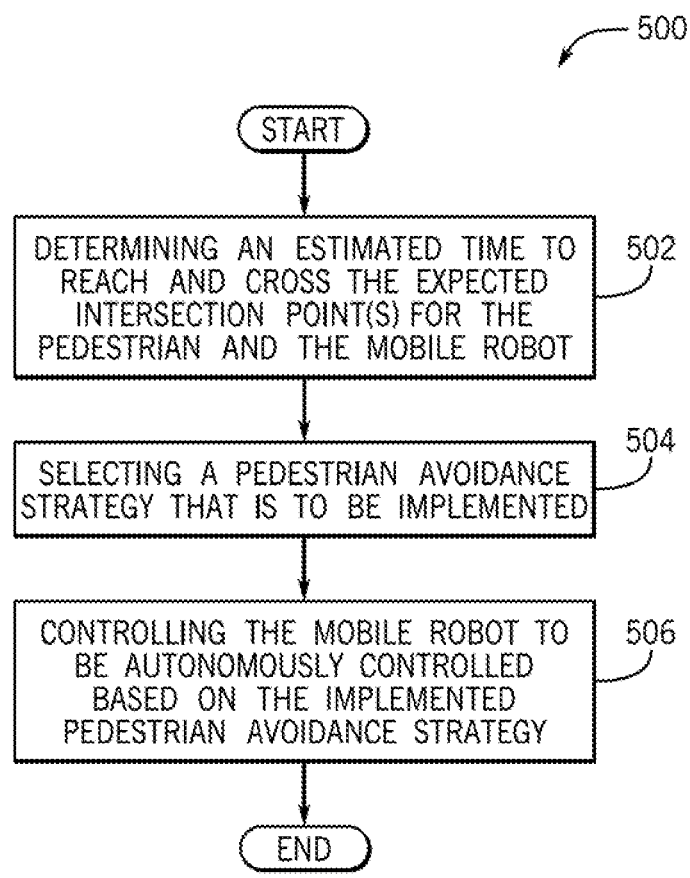
FIG. 5 is a process flow diagram of a method for implementing a particular pedestrian avoidance strategy and controlling the mobile robot to be autonomously controlled based on the implemented pedestrian avoidance strategy according to an exemplary embodiment of the present disclosure.

FIG. 5 is a process flow diagram of a method 500 for implementing a particular pedestrian avoidance strategy and controlling the mobile robot 102 to be autonomously controlled based on the implemented pedestrian avoidance strategy according to an exemplary embodiment of the present disclosure. FIG. 5 will be described with reference to the components of FIG. 1, FIG. 2, and FIG. 3, through it is to be appreciated that the method of FIG. 5 may be used with other systems/components. The method 500 may begin at block 502, wherein the method 500 may include determining an estimated time to reach and cross the expected intersection point(s) for the pedestrian 104 and the mobile robot 102.

In an exemplary embodiment, upon receiving the data points that may be utilized to estimate one or more intersection points between the mobile robot 102 and the pedestrian 104 based on one or more positions and trajectories of the mobile robot 102 and the pedestrian 104, the pedestrian strategy module 306 may be configured to analyze the positions of the mobile robot 102 and the pedestrian 104, the estimated velocities of the mobile robot 102 and the pedestrian 104, the paths 204, 206a of the mobile robot 102 and the pedestrian 104. Accordingly, the pedestrian strategy module 306 may be configured to determine an estimated time to reach and cross the expected intersection point(s) between the mobile robot 102 and the pedestrian 104 for the mobile robot 102.

The pedestrian strategy module 306 may be configured to determine an estimated time $t_h$ that the pedestrian 104 may cross an expected intersection point(s) 202a $p_{int}$ of the mobile robot 102 and the pedestrian 104. The pedestrian strategy module 306 may be configured to continue to update the estimated time $t_h$ and may continually store the updated estimate time $t_h$ upon the memory 126 as the mobile robot 102 and/or the pedestrian 104 travel towards the expected intersection point 202a $p_{int}$ until an intersection interaction decision time $t_h-T_{int}$ is reached, where $T_{int}$ is a predetermined interaction time.

The method 500 may proceed to block 504, wherein the method 500 may include selecting a pedestrian avoidance strategy that is to be implemented. In an exemplary embodiment, upon the intersection interaction decision time $t_h-T_{int}$ being reached, the pedestrian strategy module 306 may be configured to select one of the plurality of pedestrian avoidance strategies based on the estimate time $t_h$ that the pedestrian may cross the intersection point 202a $p_{int}$ and an estimated time that the mobile robot 102 may cross the intersection point 202a $p_{int}$ to reach its goal 208. Accordingly, at this time the trajectory of the mobile robot 102 may be generated according to the selected pedestrian avoidance strategy in a respective manner (as discussed above).

In one embodiment, the pedestrian strategy module 306 may estimate the time that may be taken for the mobile robot 102 to reach and cross the intersection point to $t_r=t_h-T_s$ when implementing the baseline pedestrian avoidance strategy and the curve pedestrian avoidance strategy, where $T_s$ and $T_A$ are predefined parameters. The pedestrian strategy module 306 may estimate the time that may be taken for the mobile robot 102 to reach and cross the intersection to $t_r=t_h-T_s-T_A$ for the accelerate pedestrian avoidance strategy and the curve accelerate pedestrian avoidance strategy, where $T_s$ and $T_A$ are predefined parameters.

In another embodiment, the pedestrian strategy module 306 may also take the position into account and may set the position at $t_r$ to $p_{int}$ for the baseline pedestrian avoidance strategy and the accelerate pedestrian avoidance strategy. The pedestrian strategy module 306 may also be configured to output $p_{int}+T_\Delta v_h$ where $v_h$ the walking velocity of the pedestrian 104.

In one embodiment, the estimated trajectory of the pedestrian 104 may be tracked based on the image data and/or the LiDAR data. The pedestrian strategy module 306 may execute velocity tracking as a first-order dynamical instructions parameterized by $k_p$ and $k_d$: $\dot{v}=k_p(v_d-v)-k_d$ where $v_d$ is a velocity command sent to the pedestrian strategy module 306 and v is a current velocity.

In one or more embodiments, the pedestrian strategy module 306 may thereby analyze the estimated time that the pedestrian 104 may reach and cross the expected intersection point 202a, the position of the pedestrian 104 with respect to the position of the mobile robot 102, a current estimated time for the mobile robot 102 to reach and cross the expected intersection point 202a at a current velocity of the mobile robot 102, and the plurality of pedestrian avoidance strategies. The pedestrian strategy module 306 may thereby select and implement one or more pedestrian avoidance strategies reach the goal 208 of the mobile robot 102 in a manner that avoids concurrent overlap with the path of the pedestrian 104.

The method 500 may proceed to block 506, wherein the method 500 may include controlling the mobile robot 102 to be autonomously controlled based on the implemented pedestrian avoidance strategy. In one embodiment, if the pedestrian strategy module 306 selects and implements the baseline pedestrian avoidance strategy based on the positions of the mobile robot 102 and the pedestrian 104 and the estimated time to reach and cross the expected intersection point 202a, the pedestrian strategy module 306 may communicate respective data to the robot control module 308.

The robot control module 308 may be configured to communicate instructions to implement the baseline pedestrian avoidance strategy to the ECU 110 of the mobile robot 102 to autonomously control the mobile robot 102 according to the baseline pedestrian avoidance strategy. As represented in FIG. 2A, the ECU 110 may thereby communicate instructions to one or more components of the mobile robot 102 to autonomously control the mobile robot 102 to maintain a constant speed in following its path to thereby cross the expected intersection point 202a between the mobile robot 102 and the pedestrian 104 before the pedestrian 104 is expected to cross the expected intersection point 202a.

In another embodiment, if the pedestrian strategy module 306 selects and implements the curve pedestrian avoidance strategy based on the positions of the mobile robot 102 and the pedestrian 104 and the estimated time to reach and cross the expected intersection point 202a, the pedestrian strategy module 306 may communicate respective data to the robot control module 308. As represented in FIG. 2B, upon implementing the curve pedestrian avoidance strategy, the pedestrian strategy module 306 may communicate data pertaining to the implemented curve pedestrian avoidance strategy to the robot control module 308.

In one embodiment, the robot control module 308 may thereby communicate instructions to implement the curve pedestrian avoidance strategy to the ECU 110 of the mobile robot 102 to autonomously control the mobile robot 102 according to the curve pedestrian baseline avoidance strategy. The ECU 110 may thereby communicate instructions to one or more components of the mobile robot 102 to autonomously control the mobile robot 102 to deviate from a current path 206a (shown in FIG. 2A) to a modified path 206b (shown in FIG. 2B) that may allow the mobile robot 102 to cross a modified expected intersection point 202b between the mobile robot 102 and the pedestrian 104 in a similar amount of time (4.1 seconds) as during implementation of the baseline pedestrian avoidance strategy. Accordingly, the time at which the pedestrian 104 may pass the modified expected intersection point 202b will be delayed until after the mobile robot 102 cross the modified expected intersection point 202b.

In some embodiments, if the pedestrian strategy module 306 selects and implements the accelerate pedestrian avoidance strategy based on the positions of the mobile robot 102 and the pedestrian 104 and the estimated time to reach and cross the expected intersection point 202a, the pedestrian strategy module 306 may communicate respective data to the robot control module 308. Upon implementing the accelerate pedestrian avoidance strategy, the pedestrian strategy module 306 may communicate data pertaining to the implemented accelerate pedestrian avoidance strategy to the robot control module 308.

As represented in FIG. 2C, in one embodiment, the robot control module 308 may thereby communicate instructions to implement the accelerate pedestrian avoidance strategy to the ECU 110 of the mobile robot 102 to autonomously control the mobile robot 102 according to the accelerate pedestrian avoidance strategy. The ECU 110 may thereby communicate instructions to one or more components of the mobile robot 102 to autonomously control the mobile robot 102 to accelerate while maintaining its current path 206a to cross the expected intersection point 202a before the pedestrian 104 crosses the expected intersection point 202a.

Accordingly, the mobile robot 102 may be accelerated to cross the expected intersection point 202a before the pedestrian 104 crosses the expected intersection point 202a. As compared to the baseline pedestrian avoidance strategy, the mobile robot 102 may cross the expected intersection point 202a in less time (3.5 seconds, shown in FIG. 2C) than if the pedestrian avoidance application 106 implements the baseline pedestrian avoidance strategy (4.1 seconds, shown in FIG. 2A).

As represented in FIG. 2D, if the pedestrian strategy module 306 selects and implements the curve accelerate pedestrian avoidance strategy in certain situations based on the positions of the mobile robot 102 and the pedestrian 104 and the estimated time to reach and cross the expected intersection point 202a, the pedestrian strategy module 306 may communicate respective data to the robot control module 308.

In one embodiment, the robot control module 308 may thereby communicate instructions to implement the curve accelerate pedestrian avoidance strategy to the ECU 110 of the mobile robot 102 to autonomously control the mobile robot 102 according to the curve accelerate pedestrian avoidance strategy. The ECU 110 may thereby communicate instructions to one or more components of the mobile robot 102 to autonomously control the mobile robot to modify its current path 206a (shown in FIG. 2A) to a modified path 206b (shown in FIG. 2D) to its goal 208. The mobile robot 102 may thereby change its trajectory to turn away from the pedestrian 104 and may accelerate to cross the modified expected intersection point 202b of the mobile robot 102 and the pedestrian 104 in a similar amount of time (e.g., 3.5 seconds) to the amount of time the mobile robot 102 would have utilized to cross the original expected intersection point 202a during implementation of the accelerate pedestrian avoidance strategy.

Figure 6:
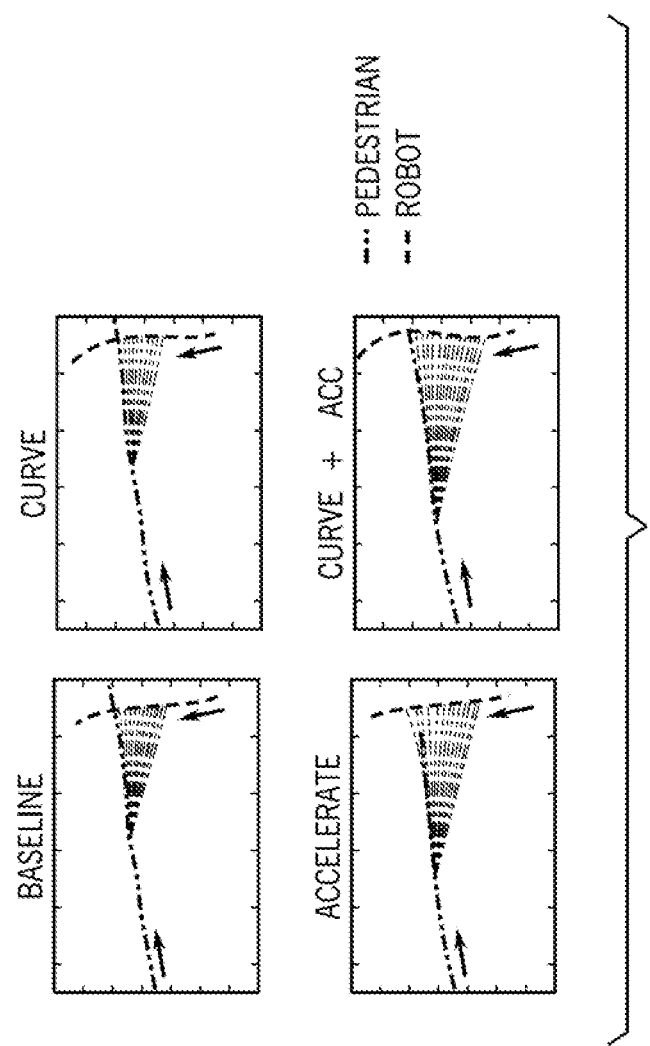
FIG. 6 is an illustrated example of the positions of the mobile robot and the positions of the pedestrian that may be realized when implementing each of the respective pedestrian avoidance strategies according to an exemplary embodiment of the present disclosure.

FIG. 6 includes an illustrated example of the positions of the mobile robot 102 and the positions of the pedestrian 104 that may be realized when implementing each of the respective pedestrian avoidance strategies according to an exemplary embodiment of the present disclosure. As shown in FIG. 6, based on the velocity of the mobile robot 102 and the pedestrian 104 captured every 0.25 seconds, the dashed lines represent the respective positions of the mobile robot 102 and the pedestrian 104 at simultaneous time steps. The implementation of each of the pedestrian avoidance strategies are based on the positions of the mobile robot 102 and the pedestrian 104 and the estimated times to cross the expected intersection point between the two. As shown, during implementation of each of the plurality of pedestrian avoidance strategies, the mobile robot 102 may be autonomously controlled to travel in a manner that avoids concurrent overlap with the path of the pedestrian 104.

Figure 7:
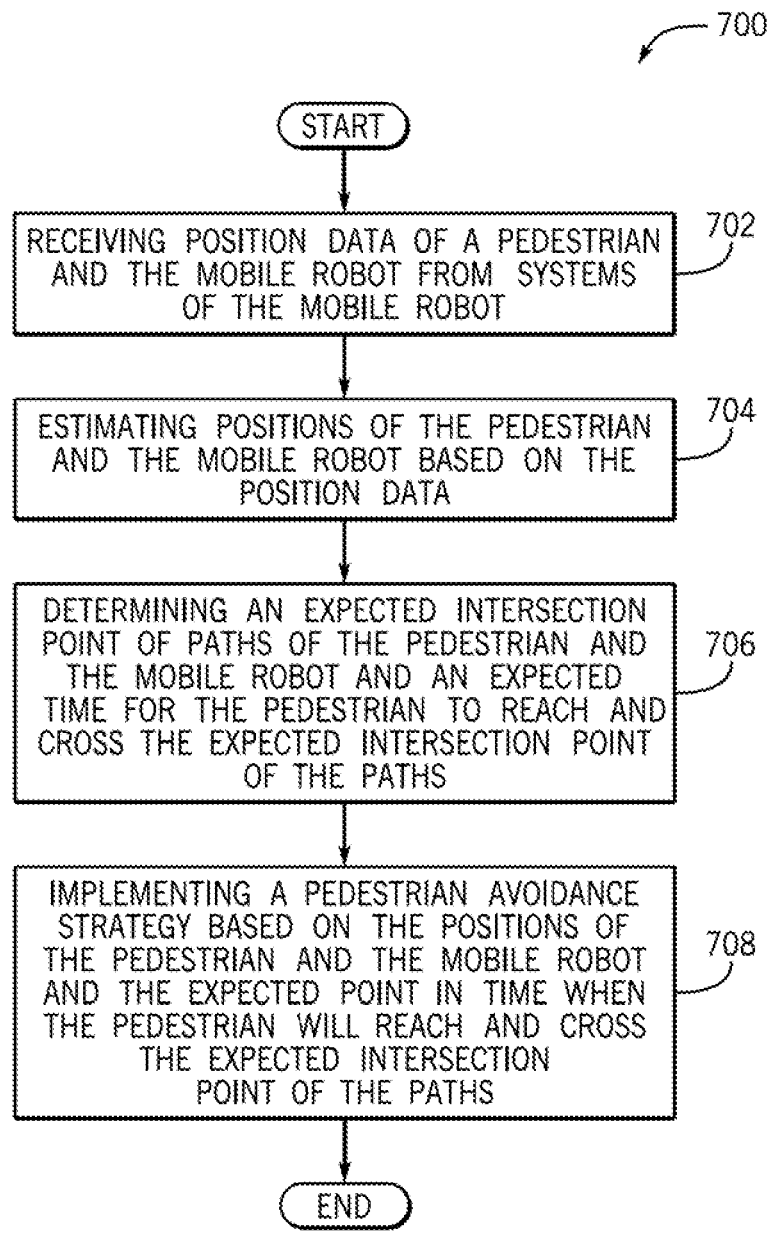
FIG. 7 is a process flow diagram of a method for implementing pedestrian avoidance strategies for a mobile robot according to an exemplary embodiment of the present disclosure.

FIG. 7 is a process flow diagram of a method 700 for implementing pedestrian avoidance strategies for a mobile robot 102 according to an exemplary embodiment of the present disclosure. FIG. 7 will be described with reference to the components of FIG. 1, FIG. 2, and FIG. 3, through it is to be appreciated that the method of FIG. 7 may be used with other systems/components. The method 700 may begin at block 702, wherein the method 700 may include receiving position data of a pedestrian and the mobile robot from systems of the mobile robot 102.

The method 700 may proceed to block 704, wherein the method 700 may include estimating positions of the pedestrian 104 and the mobile robot 102 based on the position data. The method 700 may proceed to block 706, wherein the method 700 may include determining an expected intersection point 202a of paths 204, 206a of the pedestrian 104 and the mobile robot 102 and an expected point in time when the pedestrian 104 will reach and cross the expected intersection point 202a of the paths 204, 206a. The method 700 may proceed to block 708, wherein the method 700 may include implementing a pedestrian avoidance strategy based on the positions of the pedestrian 104 and the mobile robot 102 and the expected point in time when the pedestrian 104 will reach and cross the expected intersection point 202a of the paths 204, 206a.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for implementing pedestrian avoidance strategies for a mobile robot, comprising:
receiving position data of a pedestrian and the mobile robot from systems of the mobile robot;
estimating positions of the pedestrian and the mobile robot based on the position data;
determining an expected intersection point of paths of the pedestrian and the mobile robot and an estimated time for the pedestrian to cross the expected intersection point of the paths based on datapoints output by a neural network, wherein the estimated time that the pedestrian will cross the expected intersection point of paths of the pedestrian and the mobile robot is continually updated and stored as the pedestrian travels towards the expected intersection point of paths until an intersection interaction decision time is reached, wherein the intersection interaction decision time is reached upon the estimated time being less than a predetermined interaction time, and the predetermined interaction time represents a fixed threshold duration before the pedestrian and the mobile robot are expected to interact at the expected intersection point; and
selecting and implementing a pedestrian avoidance strategy from a plurality of pedestrian avoidance strategies upon reaching the intersection interaction decision time based on the positions of the pedestrian and the mobile robot and the estimated time when the pedestrian will cross the expected intersection point and an estimated time that the mobile robot will cross the expected intersection point, wherein
a trajectory of the mobile robot is generated in accordance with the selected pedestrian avoidance strategy having predefined parameters.

2. The computer-implemented method of claim 1, wherein estimating the positions of the pedestrian and the mobile robot includes determining image based observations from image data provided by a camera system of the mobile robot.

3. The computer-implemented method of claim 2, wherein determining the expected intersection point of paths of the pedestrian and the mobile robot and the estimated time for the pedestrian to cross the expected intersection point of the paths includes communicating the image based observations to a neural network to determine positional data, trajectory data, and to determine the expected intersection point based on analysis of a pre-trained dataset used by the neural network.

4. The computer-implemented method of claim 3, wherein determining the expected intersection point of paths of the pedestrian and the mobile robot and the estimated time for the pedestrian to cross the expected intersection point of the paths includes analyzing a position of the mobile robot, a position of the pedestrian, a velocity of the mobile robot, and a velocity of the pedestrian to determine the estimated time to cross the expected intersection point of the paths.

5. The computer-implemented method of claim 1, wherein selecting and implementing the pedestrian avoidance strategy includes implementing a baseline pedestrian avoidance strategy, when the baseline pedestrian avoidance strategy is selected, in which the mobile robot is configured to utilize a current path and travel at a constant speed to reach and cross the expected intersection point prior to the pedestrian reaching and crossing the expected intersection point.

6. The computer-implemented method of claim 1, wherein selecting and implementing the pedestrian avoidance strategy includes implementing a curve pedestrian avoidance strategy, when the curve pedestrian avoidance strategy is selected, in which the mobile robot is configured to change direction and turn away from the pedestrian prior to the mobile robot reaching and crossing the expected intersection point.

7. The computer-implemented method of claim 1, wherein selecting and implementing the pedestrian avoidance strategy includes implementing an accelerate pedestrian avoidance strategy, when the accelerate pedestrian avoidance strategy is selected, in which the mobile robot is configured to utilize a current path and travel at an accelerated speed to reach and cross the expected intersection point prior to the pedestrian reaching and crossing the expected intersection point.

8. The computer-implemented method of claim 1, wherein selecting and implementing the pedestrian avoidance strategy includes implementing a curve accelerate pedestrian avoidance strategy, when the curve accelerate pedestrian avoidance strategy is selected, in which the mobile robot is configured to turn away from the pedestrian and accelerate prior to the mobile robot reaching and crossing the expected intersection point.

9. The computer-implemented method of claim 1, further including controlling the mobile robot according to the implemented pedestrian avoidance strategy to reach a goal in a manner that avoids concurrent overlap with the path of the pedestrian.

10. A system for implementing pedestrian avoidance strategies for a mobile robot, comprising:
a memory storing instructions when executed by a processor cause the processor to:
receive position data of a pedestrian and the mobile robot from systems of the mobile robot;
estimate positions of the pedestrian and the mobile robot based on the position data;
determine an expected intersection point of paths of the pedestrian and the mobile robot and an estimated time for the pedestrian to cross the expected intersection point of the paths based on datapoints output by a neural network, wherein the estimated time that the pedestrian will cross the expected intersection point of paths of the pedestrian and the mobile robot is continually updated and stored as the pedestrian travels towards the expected intersection point of paths until an intersection interaction decision time is reached, wherein the intersection interaction decision time is reached upon the estimated time being less than a predetermined interaction time, and the predetermined interaction time represents a fixed threshold duration before the pedestrian and the mobile robot are expected to interact at the expected intersection point; and
select and implement a pedestrian avoidance strategy from a plurality of pedestrian avoidance strategies upon reaching the intersection interaction decision time based on the positions of the pedestrian and the mobile robot and the estimated time when the pedestrian will cross the expected intersection point and an estimated time that the mobile robot will cross the expected intersection, wherein
a trajectory of the mobile robot is generated in accordance with the selected pedestrian avoidance strategy having predefined parameters.

11. The system of claim 10, wherein estimating the positions of the pedestrian and the mobile robot includes determining image based observations from image data provided by a camera system of the mobile robot.

12. The system of claim 11, wherein determining the expected intersection point of paths of the pedestrian and the mobile robot and the estimated time for the pedestrian to cross the expected intersection point of the paths includes communicating the image based observations to a neural network to determine positional data, trajectory data, and to determine the expected intersection point based on analysis of a pre-trained dataset used by the neural network.

13. The system of claim 12, wherein determining the expected intersection point of paths of the pedestrian and the mobile robot and the estimated time for the pedestrian to cross the expected intersection point of the paths includes analyzing a position of the mobile robot, a position of the pedestrian, a velocity of the mobile robot, and a velocity of the pedestrian to determine the estimated time to reach and cross the expected intersection point of the paths.

14. The system of claim 10, wherein selecting and implementing the pedestrian avoidance strategy includes implementing a baseline pedestrian avoidance strategy, when the baseline pedestrian avoidance strategy is selected, in which the mobile robot is configured to utilize a current path and travel at a constant speed to reach and cross the expected intersection point prior to the pedestrian reaching and crossing the expected intersection point.

15. The system of claim 10, wherein selecting and implementing the pedestrian avoidance strategy includes implementing a curve pedestrian avoidance strategy, when the curve pedestrian avoidance strategy is selected, in which the mobile robot is configured to change direction and turn away from the pedestrian prior to the mobile robot reaching and crossing the expected intersection point.

16. The system of claim 10, wherein selecting and implementing the pedestrian avoidance strategy includes implementing an accelerate pedestrian avoidance strategy, when the accelerate pedestrian avoidance strategy is selected, in which the mobile robot is configured to utilize a current path and travel at an accelerated speed to reach and cross the expected intersection point prior to the pedestrian reaching and crossing the expected intersection point.

17. The system of claim 10, wherein selecting and implementing the pedestrian avoidance strategy includes implementing a curve accelerate pedestrian avoidance strategy, when the curve accelerate pedestrian avoidance strategy is selected, in which the mobile robot is configured to turn away from the pedestrian and accelerate prior to the mobile robot reaching and crossing the expected intersection point.

18. The system of claim 10, further including controlling the mobile robot according to the implemented pedestrian avoidance strategy to reach a goal in a manner that avoids concurrent overlap with the path of the pedestrian.

19. A non-transitory computer readable storage medium storing instructions that when executed by a computer, which includes a processor perform a method, the method comprising:
receiving position data of a pedestrian and a mobile robot from systems of the mobile robot;

estimating positions of the pedestrian and the mobile robot based on the position data;

determining an expected intersection point of paths of the pedestrian and the mobile robot and an estimated time for the pedestrian to cross the expected intersection point of the paths based on datapoints output by a neural network, wherein the estimated time that the pedestrian will cross the expected intersection point of paths of the pedestrian and the mobile robot is continually updated and stored as the pedestrian travels towards the expected intersection point of paths until an intersection interaction decision time is reached, wherein the intersection interaction decision time reached upon the estimated time being less than a predetermined interaction time, and the predetermined interaction time represents a fixed threshold duration before the pedestrian and the mobile robot are expected to interact at the expected intersection point; and selecting and implementing a pedestrian avoidance strategy from a plurality of pedestrian avoidance strategies upon reaching the intersection interaction decision time based on the positions of the pedestrian and the mobile robot and the estimated time when the pedestrian will cross the expected intersection point and an estimated time that the mobile robot will cross the expected intersection point, wherein a trajectory of the mobile robot is generated in accordance with the selected pedestrian avoidance strategy having predefined parameters.

20. The non-transitory computer readable storage medium of claim 19, further including controlling the mobile robot according to the implemented pedestrian avoidance strategy to reach a goal in a manner that avoids concurrent overlap with the path of the pedestrian.

* * * * *